United States Patent [19]
Appendino

[11] Patent Number: 5,194,716
[45] Date of Patent: Mar. 16, 1993

[54] ROBOTIC WELDING DEVICE WITH COUNTERWEIGHT

[75] Inventor: Domenico Appendino, Turin, Italy

[73] Assignee: Sapri SpA, Bologna, Italy

[21] Appl. No.: 767,710

[22] Filed: Sep. 30, 1991

[30] Foreign Application Priority Data

Sep. 28, 1990 [IT] Italy .............................. 67734 A/90

[51] Int. Cl.⁵ .............................................. B23K 9/12
[52] U.S. Cl. .................................... 219/137.2; 901/42
[58] Field of Search ................ 219/137.2, 136; 901/42

[56] References Cited

U.S. PATENT DOCUMENTS 4,539,465  9/1985  Bosna .
4,757,180  7/1988  Kainz et al. ..................... 219/137.2

FOREIGN PATENT DOCUMENTS 585327   2/1947  United Kingdom .
596204  12/1947  United Kingdom .
1262634  2/1972  United Kingdom .
1265389  3/1972  United Kingdom .

*Primary Examiner*—Clifford C. Shaw
*Attorney, Agent, or Firm*—Sughrue, Mion, Zinn, Macpeak & Seas

[57] ABSTRACT

Automatic welding equipment includes a fixed support base with a motor-driven articulated arm which is rotatable on the support base and has a counterweight at one end. The equipment also includes a device for supplying welding wire to the welding zone, including a structure for rotatably supporting a reel of welding wire. The structure for supporting the reel is disposed on the counterweight of the arm so that the mass of the reel constitutes part of the overall mass of the counterweight.

4 Claims, 4 Drawing Sheets

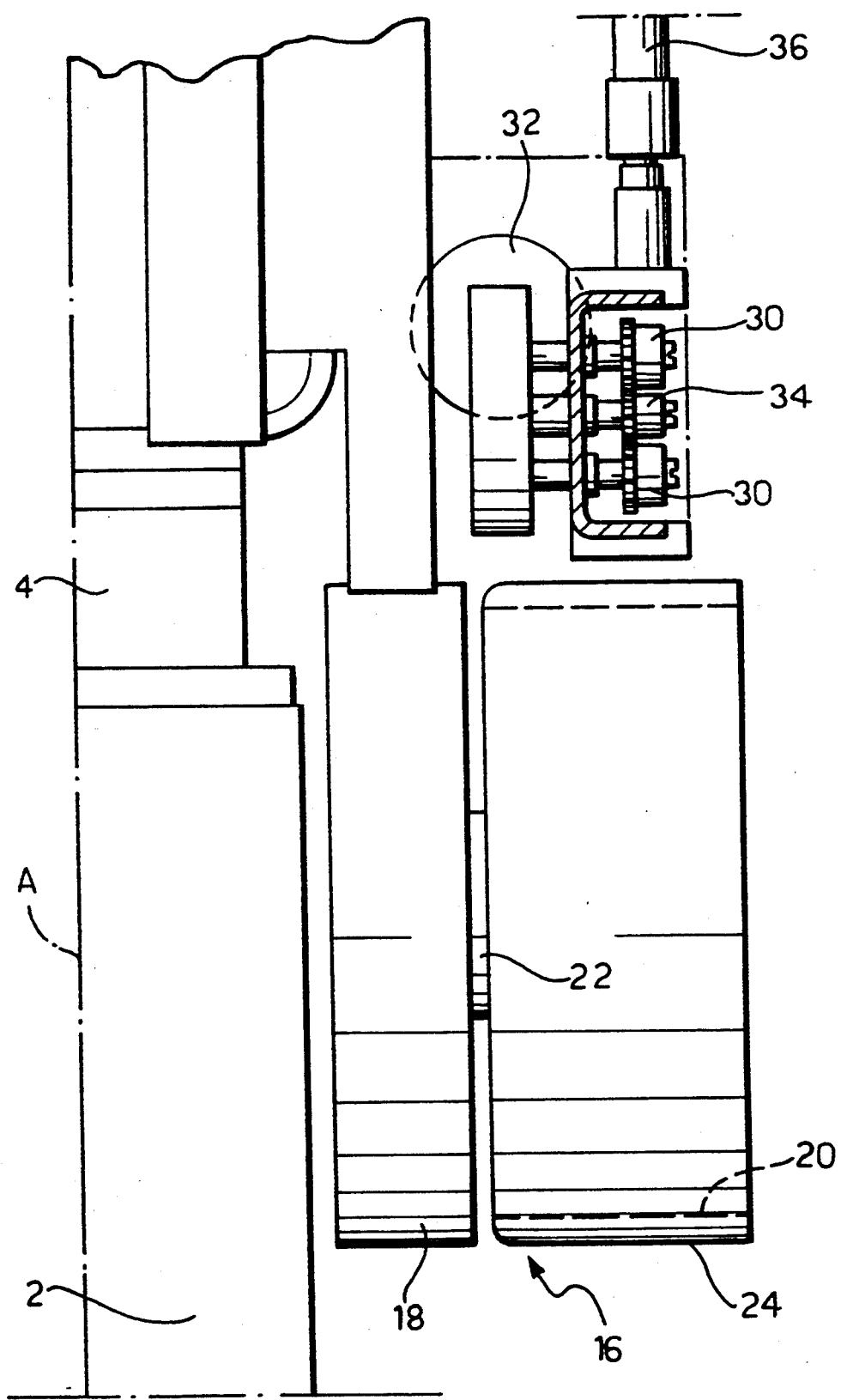

ROBOTIC WELDING DEVICE WITH COUNTERWEIGHT

BACKGROUND OF THE INVENTION

The present invention relates to automatic welding equipment of the type including:
- a fixed support base,
- a motor-driven articulated arm which is rotatable on the support base about a horizontal axis, a first end of the arm carrying a welding gun and a second end of the arm having a counterweight which is on the opposite side of the axis of rotation of the arm from the first end, and
- a device for supplying welding wire to the welding zone, including a structure for rotatably supporting a reel of welding wire, a drive unit for entraining the wire, and guide means for guiding the wire from the drive unit to the welding zone.

In known equipment of the type defined above, the reel of welding wire is disposed on a support which is fixed to the ground or to the equipment itself near its support base. Of the two solutions currently in use, the first (with the reel on the ground near the equipment) involves bulky equipment and does not make the best use of the working area in which the equipment is installed. The second solution (with the reel mounted on the equipment near its base structure) imposes limitations on the movements of the articulated arm and requires the structure and the drive means of the equipment to be of a size such that they can support the greater load due to the presence of the reel.

SUMMARY OF THE INVENTION

In order to overcome the aforementioned problems, the subject of the present invention is automatic welding equipment of the type specified above, characterised in that the structure for carrying the reel is disposed at the second end of the arm so that, in use, the mass of the reel constitutes part of the overall mass of the counterweight By virtue of this characteristic, the reel occupies a position which involves no increase in the operating space required for the equipment. Moreover, the weight of the reel not only places no stress on the structure of the equipment but is actively used to counterbalance the arm.

BRIEF DESCRIPTION OF THE DRAWINGS

Further characteristics and advantages of the present invention will become clear in the course of the detailed description which follows with reference to the appended drawings, provided purely by way of non-limiting example, in which:

FIG. 4 is a view of the part indicated by the arrow IV in FIG. 2, on an enlarged scale

DETAILED DESCRIPTION OF THE INVENTION

Figure 1:
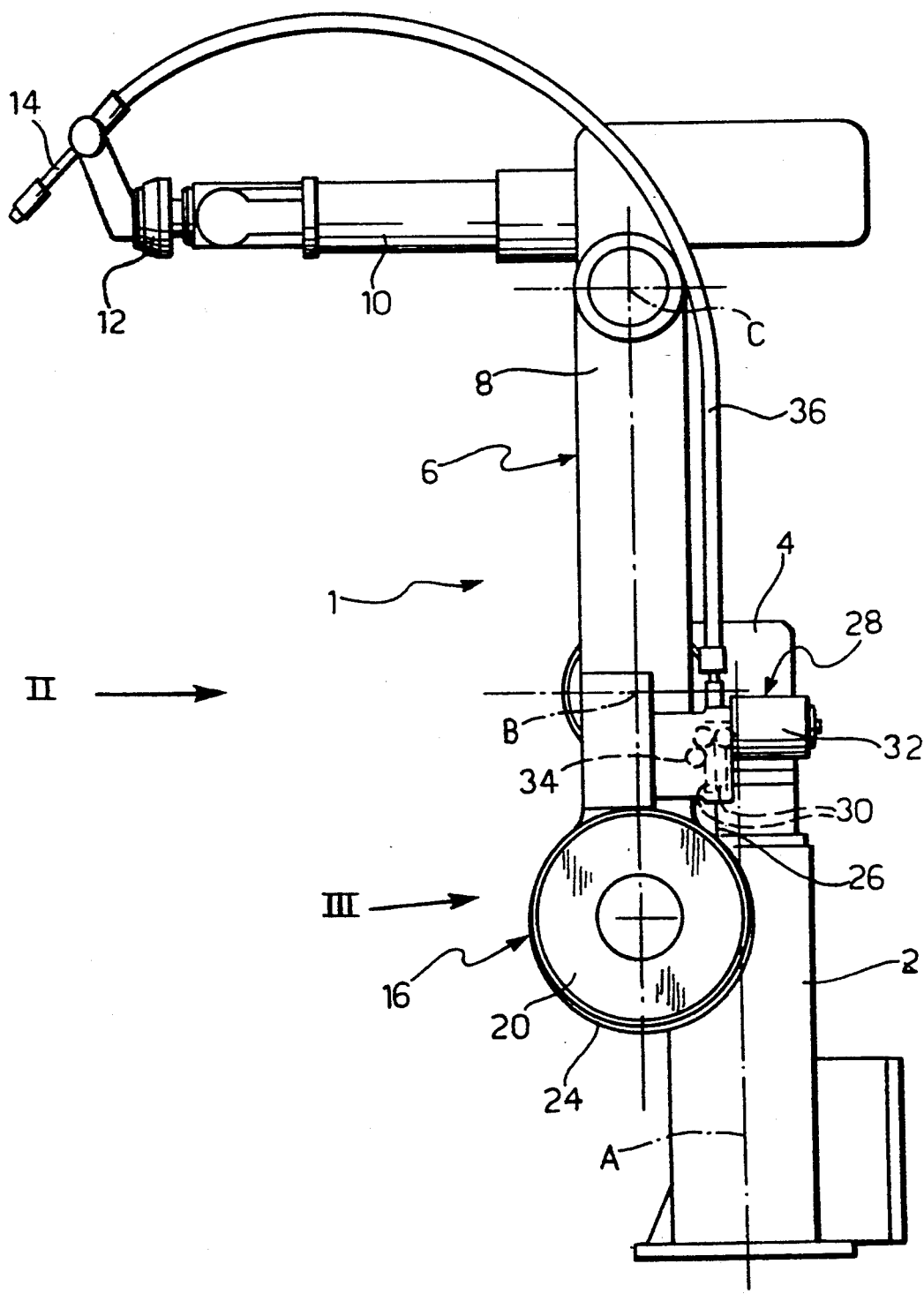
FIG. 1 is a schematic side view of equipment according to the present invention.
Figure 2:
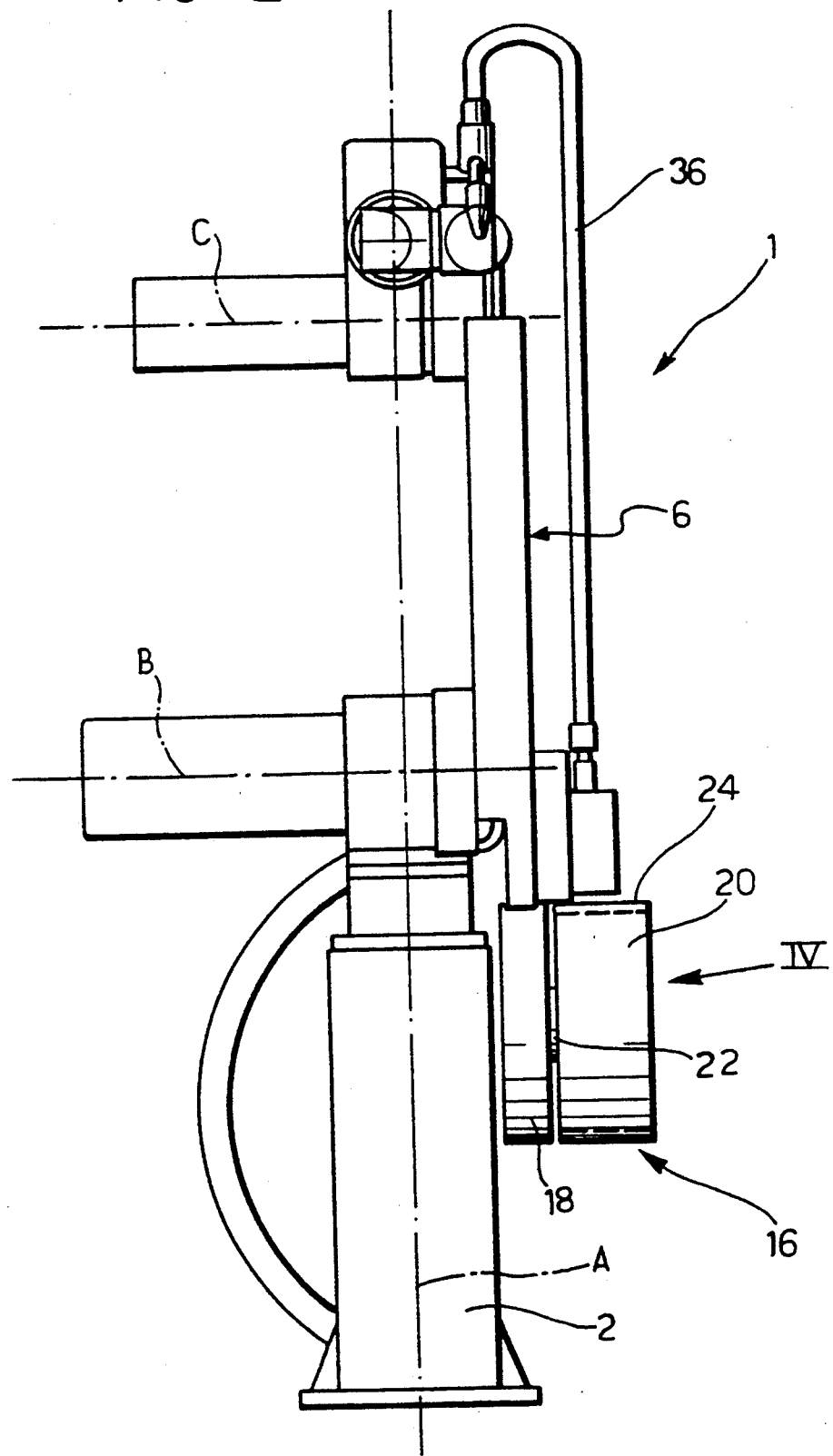
FIG. 2 is a view taken on the arrow II of FIG. 1.

With reference to the drawings, automatic welding equipment, indicated 1, includes a fixed support base 2 carrying a turret 4 which is rotatable about a vertical axis A. The turret 4 in turn carries an articulated arm 6 which is rotatable on the turret 4 about a horizontal axis B. The arm 6 is constituted by two members 8 and 10 which are articulated to each other about an axis C. The free end of the member 10 of the arm 6 carries a wrist 12 which in turn carries a welding gun 14. The member 8 of the arm 6, however, has a counterweight 16 disposed on the opposite side of the articulation axis B from the rest of the arm 6.

The counterweight 16 is constituted partly by a shaped plate 18 integral with the member 8 of the arm 6 and partly by a reel 20 of welding wire. The overall mass of the counterweight is the sum of the masses of the reel 20 and of the plate 18 and is such as to balance the arm 6. The reel is rotatable on a pin 22 carried by the plate 16 and is surrounded by a cylindrical side wall 24 also carried by the plate 16. The wire 26 coming from the reel 20 is sent to the welding gun 14 (or to the welding zone at the end of the gun 14) by a drive unit 28 constituted, in known manner, by two pairs of grooved rollers 30 rotated by a variable-speed electric motor 32 by means of a gear 34. The welding wire 26 extends through a slot in the cylindrical wall 24 and, after passing between the rollers 30, enters a guide sheath 36 which leads it to the gun 14.

The drive unit 28 is fixed to a portion of the member 8 which is on the same side of the articulation axis B of the arm 6 as the counterweight 16. The weight of the drive unit 6 is therefore taken into consideration in determining the mass of the counterweight 16.

The reel 20 is thus integrated in the structure of the arm 6 and the space occupied by the equipment 1 is smaller than in known solutions in which the reel 20 is supported by a structure fixed to the ground.

Figure 3:
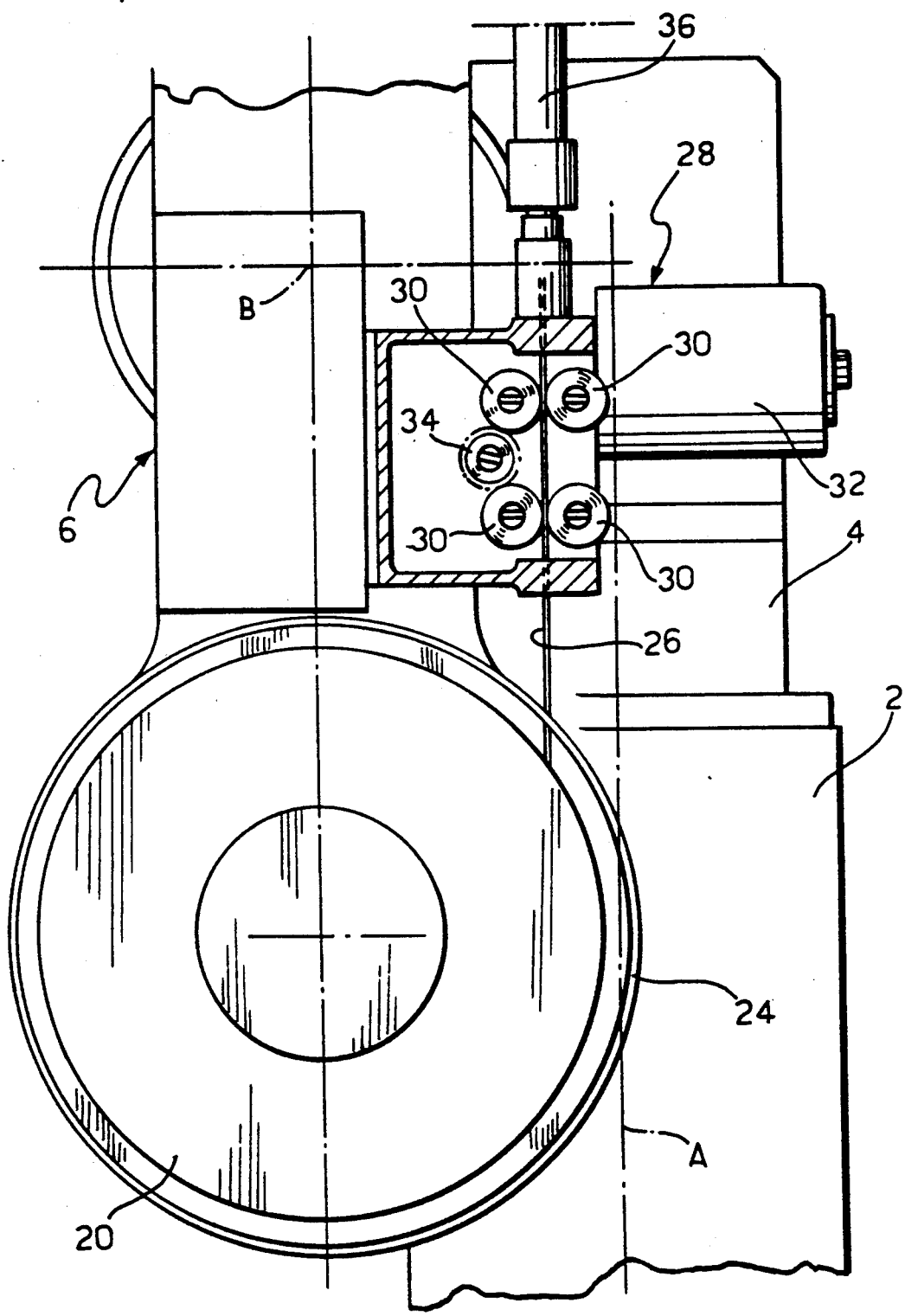
FIG. 3 is a view of the part indicated by the arrow III in FIG. 2, on an enlarged scale.

Moreover, this solution enables the guide sheath 36 to be arranged along a path which follows the shape of the arm 6 thus avoiding the use of auxiliary supports for the sheath 36. From an aesthetic point of view this arrangement also improves the appearance of the machine since the reel 20 is integrated with the counterweight structure. In fact, as can be seen in FIGS. 3 and 4, the plate 18 is shaped so as to have a circular profile of the same size as that of the reel 20.

In applications of the equipment 1 for which welding wire is not needed (for example, TIG welding) a metal disc is fixed to the pin 22 the mass of the disc, added to that of the plate 18, correctly balancing the arm 6.

What is claimed is:

1. Automatic welding equipment including:
   - a fixed support base,
   - a motor-driven articulated arm rotatable on the support base about a horizontal axis and having first and second ends,
   - a welding gun carried by the first end of the arm,
   - a counterweight carried by the second end of the arm on the opposite side of the axis of rotation from the first end, and
   - a device for supplying welding wire to the welding zone, including a structure for rotatably supporting a reel of welding wire, a drive unit for entraining the wire, and guide means for guiding the wire from the drive unit to the welding zone,
   - wherein the structure for carrying the reel is disposed offset from the horizontal axis and fixed at the second end of the arm so that, in use, the mass of the reel is fixed relative to the horizontal axis and constituted part of the overall mass of the counterweight.

2. Equipment according to claim 1, wherein the second end of the arm is shaped so as to have a circular profile, the diameter of which is substantially equal to that of the reel.

3. Equipment according to claim 2, wherein the structure for supporting the reel includes a pin extending parallel to the axis of articulation of the arm, and a cylindrical side wall surrounding the reel.

4. Equipment according to claim 1, wherein the drive unit is fixed to a portion of the arm which is on the opposite side of the articulation axis from the first end of the arm so that the mass of the drive unit helps to balance the arm.

* * * * *